United States Patent [19]

Roddeman et al.

[11] Patent Number: 4,629,177
[45] Date of Patent: Dec. 16, 1986

[54] PRESSURE ROLLER ARRANGEMENT FOR A PAPER TRANSPORT DEVICE

[75] Inventors: Gerardus J. H. Roddeman; Paul Hoogerkamp, both of Almelo, Netherlands

[73] Assignee: U.S. Philips Corporation, New York, N.Y.

[21] Appl. No.: 814,576

[22] Filed: Dec. 26, 1985

Related U.S. Application Data

[63] Continuation of Ser. No. 714,231, Mar. 21, 1985, abandoned.

[30] Foreign Application Priority Data

Dec. 7, 1984 [NL] Netherlands ................. 8403725

[51] Int. Cl.⁴ .................................. B65H 9/16
[52] U.S. Cl. ........................ 271/240; 226/17; 226/21; 226/184; 226/187; 271/251; 271/272

[58] Field of Search .............. 271/240, 250–252, 271/272–274; 226/17, 21–23, 176, 177, 184, 187

[56] References Cited

U.S. PATENT DOCUMENTS

| 2,071,682 | 2/1937 | Buccicone | 226/184 X |
| 2,801,102 | 7/1957 | Walter | 226/17 |
| 4,068,789 | 1/1978 | Young | 226/17 X |

FOREIGN PATENT DOCUMENTS 0102022  3/1984  European Pat. Off. .

Primary Examiner—Richard A. Schacher
Attorney, Agent, or Firm—David R. Treacy

[57] ABSTRACT

A device for transporting a flexible strip (11) along a guide (15) by means of conical pressure rollers (35 and 45), whose apices face each other. The pressure rollers (35 and 45) are loaded by a spring (65, 135) common to both rollers, as a result of which an accurately defined directional force is obtained towards the guide (15).

9 Claims, 8 Drawing Figures

PRESSURE ROLLER ARRANGEMENT FOR A PAPER TRANSPORT DEVICE

This is a continuation of application Ser. No. 714,231, filed Mar. 21, 1985, now abandoned.

BACKGROUND OF THE INVENTION

The invention relates to a device for transporting a flexible strip along a guide provided with at least two conical pressure rollers whose apices face each other and which are rotatable about an axis at right angles to the transport direction of the strip. At least at the area of the pressure contact with the strip, the rollers are made of an elastically deformable material. The force exerted by one pressure roller on the strip differs from the force exerted by the other pressure roller on the strip.

In the "Hewlett-Packard Journal" of the December 1982, pages 29 and 30, a device is described of the kind mentioned in the opening paragraph, which is marketed under the tradename "7470 A Graphics Plotter". Although it is not apparent from the document how the various pressure forces of the pressure rollers are obtained, it can be ascertained that each of the pressure rollers of the marketed device is coupled with a rotatable lever loaded by a tensile spring. The force exerted by the two springs on the pressure rollers in a direction at right angles to the plane of the strip at the area of the pressure contact is different. This has the effect that the strip will directionally engage the guide and is at the same time held taut.

The known device has the disadvantage that, due to tolerances in the rigidity and the dimensions of the two springs, the difference in pressure force does not always have that value which is desirable for obtaining an optimum guidance (directional effect) and for holding the strip taut to the optimum.

European Patent Application No. 0102022 also discloses a device in which use is also made of a separate spring for each pressure roller. However, a difference in pressure force is not intentionally applied for obtaining a directional effect towards the guide. Such a directional effect may occur in this device unintentionally and incidentally due to spring tolerances. It will be appreciated that in such a case no directional effect of a predetermined strength is obtained. The known device is therefore solely intended to hold the strip taut.

Furthermore, U.S. Pat. No. 3,929,327 discloses a device in which a directional effect towards a guide is obtained by means of a single elastically deformable conical roller. In this case, there is no question of simultaneously directing and stretching the strip.

SUMMARY OF THE INVENTION

The invention has for its object to avoid that disadvantage.

According to the invention a spring common to both pressure rollers exerts, via at least one coupling member, different forces on the pressure rollers.

The invention is based on the recognition of the fact that, when for both pressure rollers use is made of only on spring, no spring tolerances need be taken into account. Without use of the invention, in the most unfavorable case these tolerances would be summed. The difference in pressure forces can thus be kept within comparatively narrow limits.

A particular embodiment of the device according to the invention, which supplies an additional stretching force and directional effect on the strip, is further characterized in that one pressure roller is rotatably journalled in a first tiltable L-shaped coupling member having a first lever arm, while the other pressure roller is journalled in a second tiltable L-shaped coupling member having a second lever arm different from the first lever arm, one end of the common spring exerting a tensile force on the first coupling member and the other end of the spring exerting a tensile force on the second coupling member.

A preferred embodiment of the device according to the invention, in which the axis of rotation of the pressure rollers invariably is perpendicular to the transport direction of the strip, is further characterized in that each of the coupling members is tiltable about a line which lies in a plane perpendicular to the axis of rotation of the relevant pressure roller and which is parallel to the transport direction of the strip and is constituted by the connection line between two pivots of the coupling member.

A further embodiment of the invention having a comparatively compact construction is characterized in that the coupling member consists of a movable bridge which is coupled with both pressure rollers and is subjected to an asymmetrical pressure force by the common spring. This bridge is provided with positioning rollers which are supported by roller surfaces of rotatable connection arms. These arms then support the rotatable pressure rollers.

The invention will be described more fully with reference to the drawing.

DESCRIPTION OF THE PREFERRED EMBODIMENTS

Figure 1:
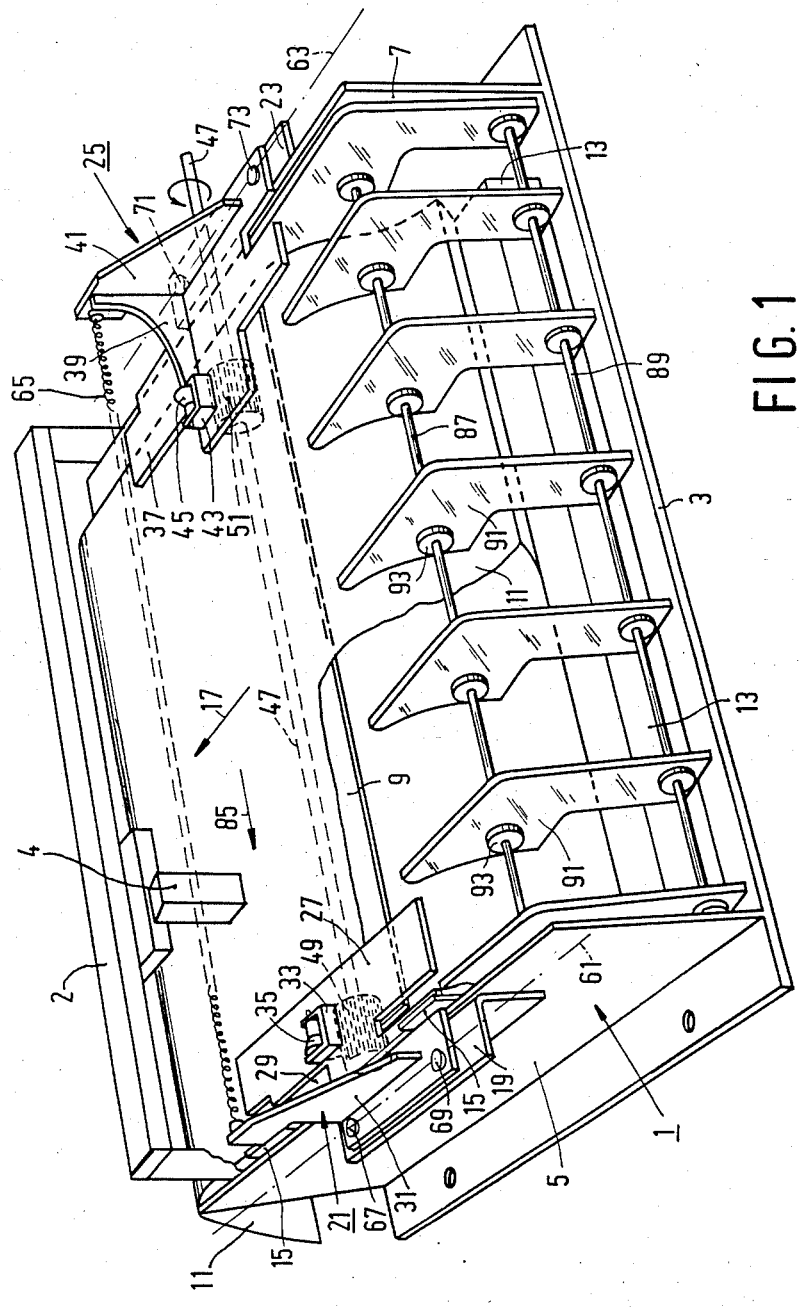
FIG. 1 is a perspective view of a preferred embodiment of the device according to the invention.

The device shown in FIG. 1 is a device for transporting information carrier strips (for example paper strips) and is preferably used in chart recorders or printers. These devices may be used for automatic recording of measurement results, or the display of graphs, diagrams and images visible on a monitor. For recording and displaying, use is made of writing pins. In printing, the invention may be used with matrix printers having impact members or thermal printing members, optical printers having a photo-sensitive information carrier or electronic typewriters. Such printers may be computer-controlled.

Figure 2:
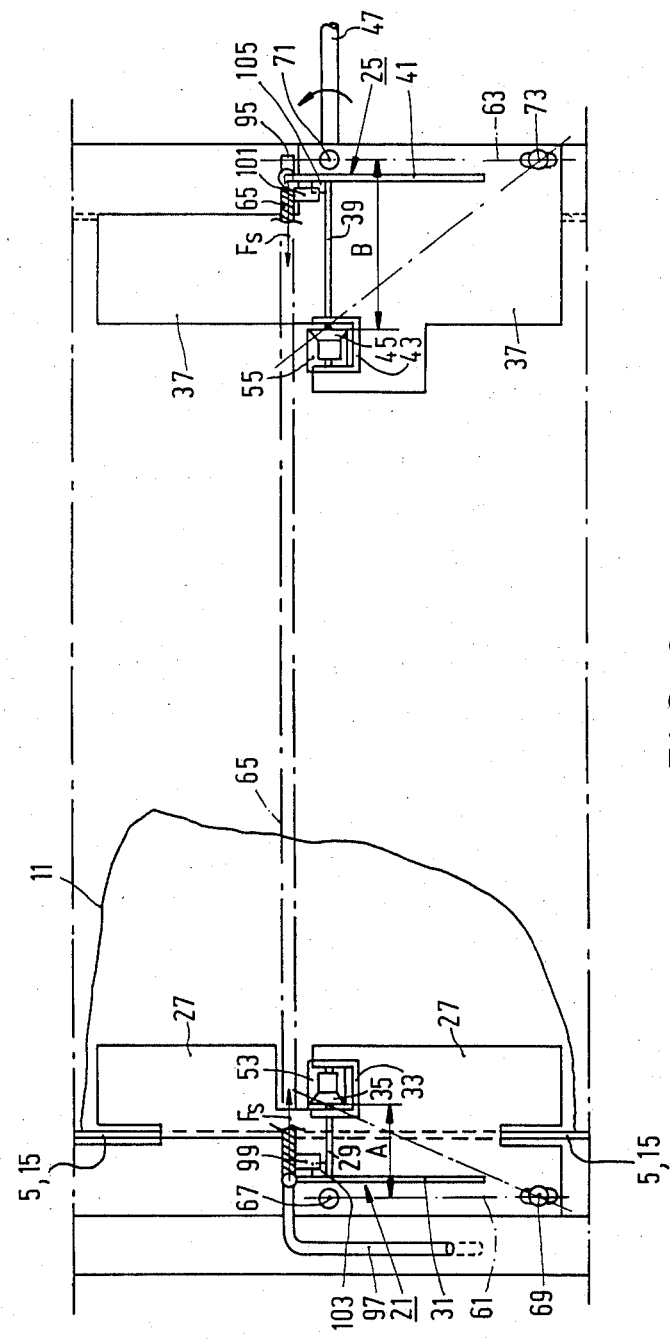
FIG. 2 is a diagrammatic plan view of the device shown in FIG. 1.
Figure 3:
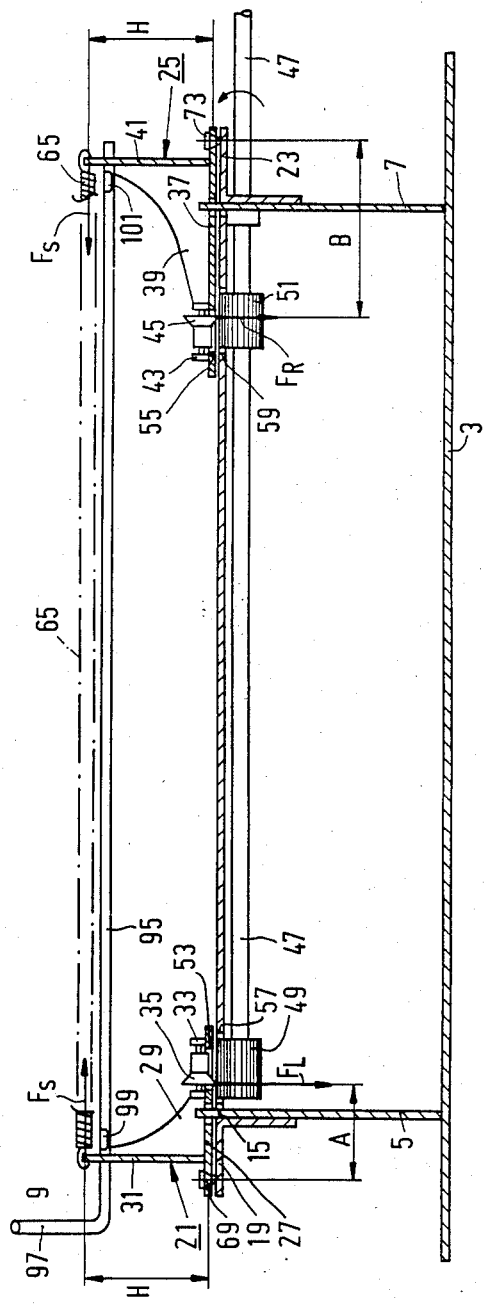
FIG. 3 is a diagrammatic cross-section of the device shown in FIG. 1.

The device shown in FIG. 1 has a frame 1 with a bottom 3 and two parallel side walls 5 and 7 arranged at right angles thereto. A beam 2 extends at right angles to the side walls 5 and 7, while along this beam a printing head 4 (shown only diagrammatically) is guided. For the sake of clarity, the front wall and the rear wall of the transport device and the printing or writing members are not shown. In the transport device a flat support 9, parallel to the bottom 3, supports a paper strip 11, which is supplied from a paper supply 13. The paper supply 13 consists of a stack of folded paper. The side wall 5 has secured to it a flat transverse guide 15 for the paper strip 11, perpendicular to the plane of the support 9 and parallel to the transport direction of the paper strip 11. The transport direction is indicated by an arrow 17. The transverse guide 15 may also be integrated in the side wall 5 and may constitute the upper part thereof, as is shown in FIGS. 2 and 3, or may form part of one of the coupling members described below. A bracket 19 secured to the side wall 5 forms a support for a first L-shaped coupling member 21, while a bracket 23 secured to the side wall 7 forms a support for a second L-shaped coupling member 25. The coupling members 21 and 25 are preferably made of a transparent material for the sake of the visibility of the printed information.

The first coupling member 21 comprises a flat paper guide 27, which is parallel to the support 9, and a transverse partition wall 29 and a longitudinal wall 31. Both the brace 29 and wall 31 are at right angles to the paper guide 27. The transverse brace is at right angles to the paper transport direction 17, while the longitudinal wall 31 is parallel thereto. The paper guide 27 has secured on it a U-shaped bracket 33, in which a first conical pressure roller 35 is rotatably journalled.

The second coupling member 25 similarly comprises a flat paper guide 37 which is parallel to the support 9 as well as a transverse brace or wall 39 and a longitudinal partition wall 41. Both the brace 39 and wall 41 are at right angles to the paper guide 37. The transverse brace 39 is at right angles to the paper transport direction 17, while the longitudinal wall 41 is parallel thereto. The paper guide 37 has secured on it a U-shaped bracket 43, in which a second conical pressure roller 45 is rotatably journalled.

The axes of rotation of the conical rollers 35 and 45, whose apices face each other, are in line with each other and perpendicular to the paper transport direction 17. Two driving rollers 49 and 51 corresponding to the pressure rollers 35 and 45 are secured on a driving shaft 47 rotatably journalled in the side walls 5 and 7. The axes of rotation of the pressure rollers 35 and 45 are parallel to the driving shaft 47. In the paper guides 27 and 37 windows 53 and 55 are provided, through which the pressure rollers 35 and 45 are passed (see FIGS. 2 and 3). The support 9 is provided with windows 57 and 59, through which the driving rollers 49 and 51 are passed (see FIG. 3). The paper strip 11 is located between the pressure rollers 35 and the corresponding driving roller 49 and between the pressure rollers 45 and the corresponding driving roller 51.

Figure 4:
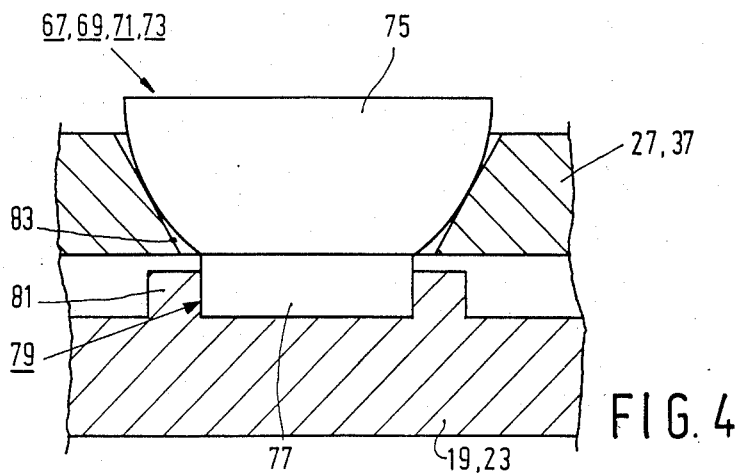
FIG. 4 shows a detail of a pivot for the coupling member used in the device shown in FIGS. 1 to 3.

The pressure contact between the pressure rollers 35 and 45 and the paper strip 11 and the driving rollers 49 and 51, respectively, is obtained by means of the coupling members 21 and 25. For this purpose, the coupling members 21 and 25 are tiltable about tilting axes 61 and 63, respectively, by means of a tensile spring 65. The tilting axis 61 is constituted by the connection line between two pivots 67 and 69, while the tilting axis 63 is constituted by the connection line between two pivots 71 and 73. In FIG. 4, a detail of the substantially identical pivots 67, 69, 71 and 73 is shown. Each of the pivots is constituted by a spherical section 75 which is provided with a cylindrical part 77 welded in a cylindrical dish 79 formed by an annular collar 81 of the respective fixedly arranged bracket 19 and 23. In the paper guides 27 and 37 there are formed two openings 83, of which the boundary walls form a section of a conical surface. The paper guides 27 and 37 can consequently slide along the walls of the openings 83 and can thus tilt about the tilting lines 61 and 63.

Since the points of application of the tensile spring 65 to the coupling members 21 and 25 are located at a vertical distance H from the pivots 67, 69, 71 and 73, the coupling members 21 and 25 act as levers which are rotatable about the tilting axes 61 and 63. The distances A and B, respectively (see FIG. 3) between the pressure points of the conical rollers 35 and 45 and the tilting lines 61 and 63 are different so that the lever arms are also different. The length of the first lever arm is consequently equal to A, while the length of the second lever arm is equal to B. When the tensile force of the spring 65 is equal to $F_s$, the pressure forces $F_L$ and $F_R$ of the respective conical pressure rollers satisfy the relations:

$$F_L = (H/A) \cdot F_s \text{ and } F_R = (H/B) \cdot F_s.$$

In the present case, $B > A$, so that $F_L > F_R$. This not only causes the paper strip 11 to be held taut in a direction indicated in FIG. 1 by an arrow 85 (at right angles to the transport direction 17), but also a resulting force is exerted on the paper strip 11 in the direction of the arrow 85, which urges the longitudinal edge of the paper strip 11 against the transverse guide 15. The paper strip 11 is consequently held constantly against the transverse guide 15 during the transport in the direction 17 so that meandering of the paper strip 11 is prevented. Due to the fact that use is made of only one common spring 65 for both pressure rollers 35 and 45, the pressure forces $F_L$ and $F_R$ can be kept within narrow limits. Thus, the directional force on the paper strip in the direction 85 is also accurately defined and the risk of bulging and folding or rumpling, respectively, of the paper strip 11 due to an excessively large engagement force against the transverse guide 15 is considerably reduced. It should be noted that the triangles formed by the two pivots and the center of the relevant pressure rollers are triangles which are rotatable about the relevant tilting axes (see FIG. 2).

The conical pressure rollers 35 and 45 are preferably obtained by injection-molding from silicone rubber or polyurethane and are secured on the respective rotary shafts by means of bearing bushings. The pressure rollers have a cylindrical part which adjoins a conical part (section of a cone) and establishes the connection with the bearing. The conical part of the pressure rollers is preferably made hollow in order to obtain a sufficiently large deformability. This is desirable in connection with the desired size of the contact area with the paper strip. Hollow conical pressure rollers are otherwise known per se from the aforementioned U.S. Pat. No. 3,929,327.

The driving rollers 49 and 51 are preferably made of steel. For the sake of a good application to the paper strip, the driving rollers are provided with a longitudinal knurl which may be hardened. This permits so-called "breathing" of the paper in a transverse direction at comparatively low transport speeds and under changing climatologic conditions. Due to the tensile force of the spring 65 on the coupling members 21 and 25 and the reaction force of the support 9 on the pressure rollers 35 and 45, the pivots 67, 69, 71 and 73 are kept free of clearance. Since the tensile force $F_s$ applies in a vertical plane through the pivots 67 and 71, the reaction force in the pivots 69 and 73 is comparatively small. This force can be added to a pre-tension force of dish springs (not shown) arranged at the area of the pivots 69 and 73 between the consoles 19 and 23 and the paper guides 27, 37. Although the tensile force $F_s$ would preferably be applied in a vertical plane halfway between the pivots 67,69 and the pivots 71,73 from a viewpoint of distribution of forces, this is not the case for the sake of the visibility of the printed information and the possibility of recording annotations directly beside the printed information.

Two parallel rods 87 and 89 are secured in the side walls 5 and 7, while a number of paper guides 91 are secured on these rods by means of locking washer 93 (see FIG. 1). The paper guides 91 guide the paper strip 11 from the stack 13 to the support 9. With a transport which takes place in a direction opposite to the direction 17, the paper guides 91 favor the formation of the stack 13. The paper guides 91 may be replaced by a curved plate.

Figure 5:
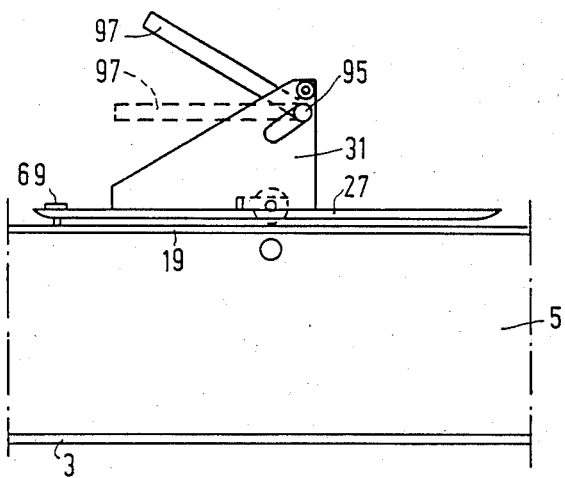
FIG. 5 is a diagrammatic side elevation of the device shown in FIG. 1.

By means of a rod 95 which is rotatably journalled in the longitudinal partition walls 31 and 41 and to which an actuation arm 97 is secured (see FIGS. 2 and 3), the paper guides 27 and 37 with the pressure rollers 35 and 45 can be lifted so that the paper strip 11 can readily be removed. The rod 95 is provided for this purpose near the lefthand and the righthand end with tongues 99 and 101 which upon rotation of the rod 95 are in engagement with tongues 103 and 105 formed on the coupling members 21 and 25. Upon rotation of the rod 95, the coupling members 21 and 25 are tilted about the tilting axes 61 and 63 (see also FIG. 5). By means of a cam follower (not shown further) on the laterally displaceable rod 95 and a cam on the coupling members 21 and 25, the rod 95 can be locked in the position indicated by dotted lines.

Figure 8:
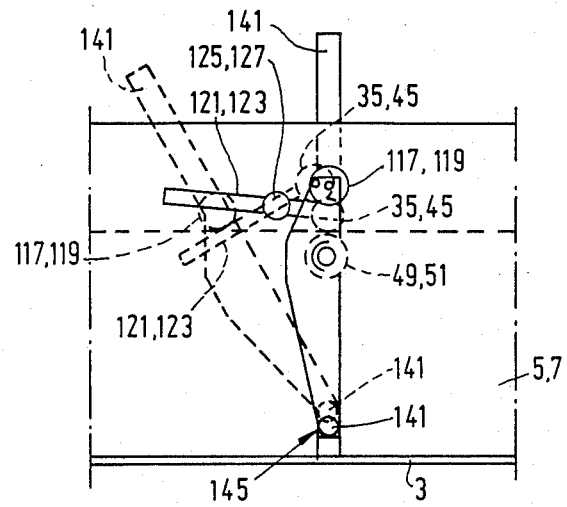
FIG. 8 is a diagrammatic side elevation of the device shown in FIG. 6.
Figure 6:
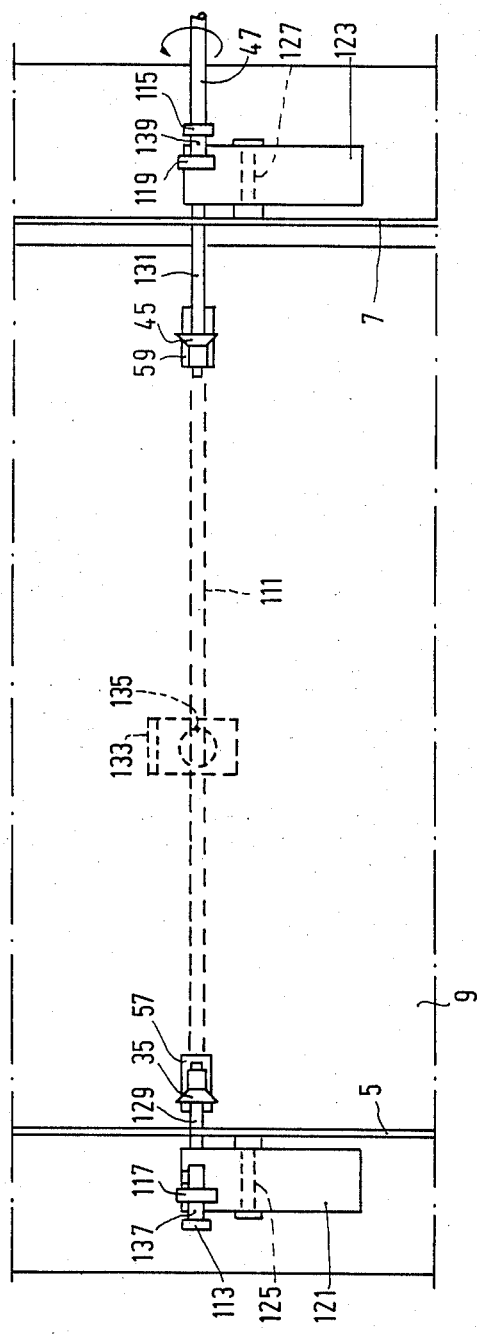
FIG. 6 is a diagrammatic plan view of an alternative embodiment of the device according to the invention.
Figure 7:
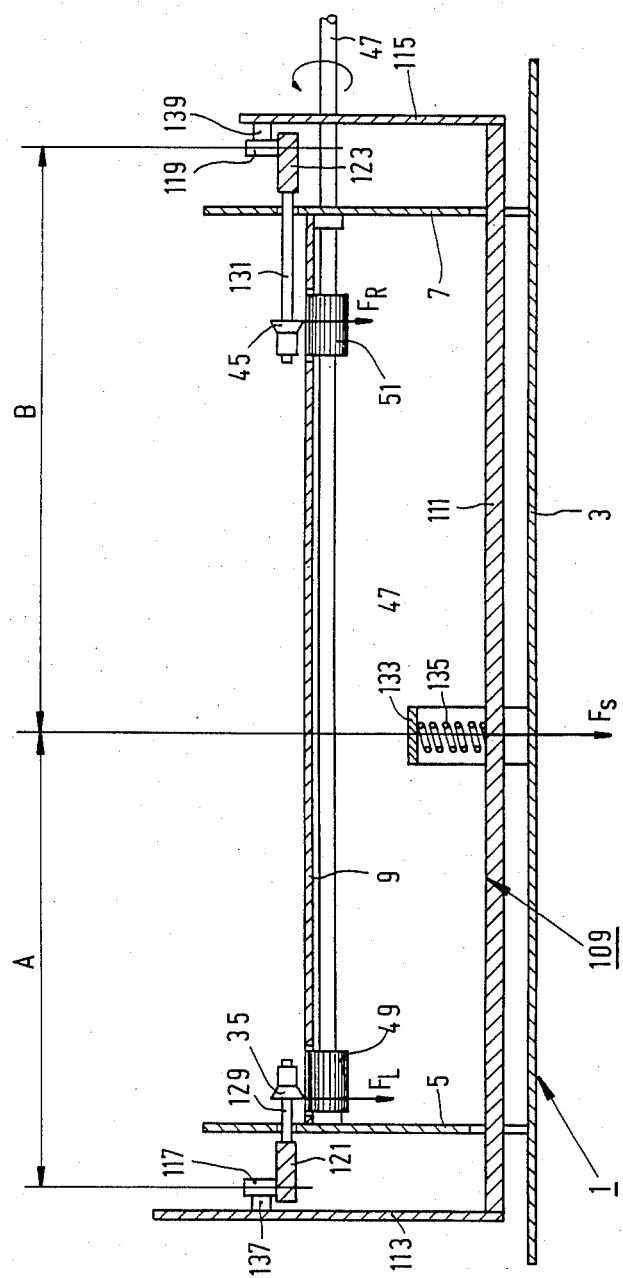
FIG. 7 is a diagrammatic cross-section of the device shown in FIG. 6.

The alternative embodiment of the device according to the invention shown in FIGS. 6, 7 and 8, which is provided as far as possible with reference numerals corresponding to those in the preceding figures, has only one coupling member 109 in the form of a bridge. The bridge 109 is constituted by a transverse rod 111 which is passed through openings in the side walls 5 and 7 and has two arms 113 and 115 which are at right angles to the transverse rod 111. The arms 113 and 115 have secured to them rotatable positioning rollers 117 and 119, by means of which the bridge 109 can be moved over roller surfaces of connection arms 121 and 123. The connection arms 121 and 123 are secured to shafts 125 and 127 which are rotatably journalled in the side walls 5 and 7 (see FIG. 6). The conical pressure rollers 35 and 45 are rotatably journalled on rods 129 and 131 rigidly connected to the connection arms 121 and 123. A compression spring 135 is arranged between an L-shaped bracket 133 secured on the bottom 3 and the strip-shaped transverse rod 111. The spring 135 keeps the positioning rollers 117 and 119 pressed against the roller surfaces of the connection arms 121 and 123. Windows 57 and 59 in the support 9, through which the driving rollers 49 and 51 are passed, permit pressure contact with the conical pressure rollers 35 and 45. In the case in which the rods 129 and 131 are provided with paper guides 27 and 37, as shown in FIG. 1, these paper guides are also provided with windows through which the pressure rollers 35 and 45 are passed. Such paper guides are desirable, but are not always necessary.

The transverse guide 15 (see FIG. 1) is constituted in the embodiment by the side wall 5. Since the compression spring 135 is arranged asymmetrically at a distance A from the positioning roller 117 and at a distance B from the positioning roller 121, where A is smaller than B, the driving roller 49 is subjected to a larger pressure force by the pressure roller 35 than that to which the driving roller 51 is subjected by the pressure roller 45. When the pressure force of the spring 135 is made equal to $F_s$, the pressure forces $F_L$ and $F_R$ exerted by the pressure rollers 35 and 45 satisfy the relations:

$$F_L = \frac{B}{A+B} \cdot F_s \text{ and } F_R = \frac{A}{A+B} \cdot F_s$$

In the pressed condition of the pressure rollers 35 and 45, the positioning rollers 117 and 119 are in the position shown in FIG. 6, in which the parallel connection lines between the axes of rotation of the positioning rollers 117 and 119 and between the axes of rotation of the pressure rollers 35 and 45 are located in the same vertical plane. The center line of the driving shaft 47 is also located in this vertical plane. The connection lines and the center line are consequently shifted, as projected on the horizontal plane, with respect to the connection line between the rotary shafts 125 and 127 of the rotatable connection arms 121 and 123. When the bridge 109 with the positioning rollers 117 and 119 is moved over the roller surfaces of the connection arms 121 and 123 to the other side of the shafts 125 and 127 (compared with the position shown in FIG. 6), the connection arms 121 and 123 rotate about the shafts 125 and 127 and the pressure rollers 35 and 45 of the paper strip 11 (not shown in FIG. 6) and the driving rollers 49 and 51 are simultaneously lifted. The paper strip 11 can then readily be removed.

FIG. 8 illustrates how the bridge 109 can be moved over the connection arms 121 and 123. The positioning rollers 117 and 119 (see also FIGS. 6 and 7) are rotatably journalled on stub shafts 137 and 139 which are secured to arms 113 and 115. By means of a rotatable lever 141, each of shafts 137 and 139 is pivotable about the center of rotation of a pin 143, which is slidably and rotatably guided in a slot 145 in the side walls 5 and 7. For the sake of clarity, coupling of the lever 141 to the shafts 137 and 139 is not shown. In the present case, however, the lever 141 is an elongated part of the arms 113 and 115. The pin 143 is secured to the lever 141. Upon rotation of the levers 141 in the counterclockwise direction to the position shown in FIG. 8 in dotted lines, the positioning rollers 117 and 119 roll over the connection arms 121 and 123 to the position shown in dotted lines. Due to the pressure force of the spring 135, the connection arms 121 and 123 are rotated about the shafts 125 and 127 as soon as the positioning rollers 117 and 119 pass the arms 125 and 127. The pin 143 slides during this rotational movement upwards in the slot 145 while simultaneously rotating. It will be appreciated that the levers 141 are held by the spring 135 in the position shown in dotted lines until they are manually returned to the vertical position.

The invention provides a transport device for writing and printing devices, in which the directional force and the pressure force are strongly independent of spring tolerances, while moreover component parts are saved. These forces can be kept sufficiently accurately within the desired limits in the wide range of transport speeds (up to 2 m/sec) occurring in practice. Thus, the risk of bulging and meandering paper is considerably reduced.

Although the invention is described with reference to a transport device for writing and printing devices, in which standard paper is used, it is not limited thereto. The invention can be used in the transport of flexible information strips both of comparatively large and small length. Due to the fact that the transport device ensures that a longitudinal edge of the information carrier engages the transverse guide, the beginning of printing or writing information always occurs at a defined area of the information carrier. The information carrier may be constituted by the conventional paper or by multi-layer strips with, for example, a dielectric layer, a heat-sensitive layer or a pressure-sensitive layer for electrostatic, thermal or impact printing arrangements. In the case of thermal printing devices, the heat transfer to the information carrier can be obtained by means of a so-called thermal printing head or laser printing head. Printing devices, in which ink drops are used, are also included.

It will be appreciated that the term "flexible strip" does not include those strips in which the magnetization of a layer is varied by a magnetic printing head. Furthermore, those flexible strips should be excluded which are provided for the manufacture of clothing or fabrics with a print or a pattern. However, flexible strips, such as credit cards and other official documents, which are provided with a print or a pattern, are also included. In general, it may be said that the printing strip has to comprise information or data, although, as already stated, this strip is not of magnetic nature.

What is claimed is:

1. A device for transporting a flexible strip in a transport direction along a guide, comprising:
    at least two conical pressure rollers, each being rotatable about its respective conical axis and being arranged with said axis transverse to said transport direction, the apices of the roller facing each other; at least at a respective area of pressure contact with the strips, each conical roller being made of an elastically deformable material, and
    means for urging said rollers against a strip being transported, said means being arranged such that the force exerted by one pressure roller on the strip differs from the force exerted by the other pressure roller,
    characterized in that said means comprises a single spring and at least one coupling member, said single spring applying different forces respectively on said pressure rollers via said at least one coupling member.

2. A device as claimed in claim 1, characterized by comprising a first tiltable coupling member having a first lever arm, said one pressure roller being rotatably journalled to said first coupling member; and a second tiltable coupling member having a second lever arm, said other pressure roller being rotatably journalled to said second coupling member,
    said single spring having one end exerting a given force on said first coupling member, and said spring having a second end exerting a force equal to said given force on said second coupling member.

3. A device as claimed in claim 2, characterized in that each coupling member has two pivots respectively, said pivots defining a respective connection line which is parallel to the transport direction and perpendicular to the respective axis of rotation of the respective pressure roller, each coupling member being tiltable about its respective connection line.

4. A device as claimed in claim 3, characterised in that each coupling is L-shaped, and said spring is a tensile spring.

5. A device as claimed in claim 2, wherein said guide comprises two transport rollers coaxially arranged to be rotatable about an axis transverse to said transport direction, each pressure roller being arranged to cooperate with a respective transport roller so that the strip passes therebetween,
    characterized in that each coupling member has two pivots respectively, said pivots defining a respective connection line which is parallel to the transport direction and perpendicular to the respective axis of rotation of the respective pressure roller, each coupling member being tiltable about its respective connection line, and said spring being coupled to the respective coupling members so as to urge them pivotally about the respective connection lines.

6. A device as claimed in claim 1, wherein said guide comprises two transport rollers coaxially arranged to be rotatable about an axis transverse to said transport direction, each pressure roller being arranged to cooperate with a respective transport roller so that the strip passes therebetween,
    characterized in that each coupling member has two pivots respectively, said pivots defining a respective connection line which is parallel to the transport direction and perpendicular to the respective axis of rotation of the respective pressure roller, each coupling member being tiltable about its respective connection line, and
    said means includes means for coupling said single spring to the respective coupling members so as to urge them pivotally about the respective connection lines.

7. A device for transporting a flexible strip in a transport direction along a guide, comprising:
    at least two conical pressure rollers, each being rotatable about its respective conical axis and being arranged with said axis transverse to said transport direction, the apices of the rollers facing each other; at least at a respective area of pressure contact with the strips, each conical roller being made of an elastically deformable material, and
    means for urging said rollers against a strip being transported, said means being arranged such that the force exerted by one pressure roller on the strip differs from the force exerted by the other pressure roller,
    characterized in that said means comprises a single spring, and
    a movable bridge coupled to both pressure rollers, said single spring being coupled asymmetrically to said bridge so as to apply different forces respectively on said pressure rollers.

8. A device as claimed in claim 7, characterized by comprising:
    first and second connection arms having respective roller surfaces, and
    means for mounting said connection arms to said guide for rotation about respective arm axes generally parallel to said pressure roller axes,
    said bridge further comprising first and second positioning rollers arranged to bear against and be supported respectively by said roller surfaces.

9. A device as claimed in claim 7, wherein said guide comprises two transport rollers coaxially arranged to be rotatable about an axis transverse to said transport direction, each pressure roller being arranged to cooperate with a respective transport roller so that the strip passes therebetween, characterized by comprising:

first and second connection arms having respective roller surfaces, and means for mounting said connection arms to said guide for rotation about respective arm axes generally parallel to said pressure roller axes, said bridge further comprising first and second positioning rollers arranged to bear against and be supported respectively by said roller surfaces.

* * * * *